United States Patent

Castedello

[15] 3,685,893

[45] Aug. 22, 1972

[54] CASSETTE FOR A SOUND SLIDE PROJECTOR

[72] Inventor: William Castedello, Southington, Conn.

[73] Assignee: The Kalart Company, Inc., Plainville, Conn.

[22] Filed: Oct. 8, 1969

[21] Appl. No.: 864,697

[52] U.S. Cl. .............353/120, 40/28.1, 179/100.2 Z, 242/199, 242/204, 274/4 C, 353/15, 353/19

[51] Int. Cl. .........................G03b 21/00, G03b 31/06

[58] Field of Search................353/15, 16, 17, 18, 19; 40/28.1, 28.2; 274/4 C; 179/100.2 Z; 242/191, 192, 204, 74, 197–200

[56] References Cited

UNITED STATES PATENTS

| | | | |
|---|---|---|---|
| 2,652,918 | 9/1953 | Lippert | 242/74 |
| 2,720,137 | 10/1955 | Musebeck et al | 353/109 |
| 3,177,768 | 4/1965 | Hallamore | 353/120 |
| 3,357,302 | 12/1967 | Gerry | 353/15 |
| 3,404,848 | 10/1968 | Fundingsland | 242/191 |
| 3,532,293 | 10/1970 | Rose | 274/11 D |

*Primary Examiner*—Leonard Forman
*Assistant Examiner*—Steven L. Stephan
*Attorney*—Hane & Baxley

[57] ABSTRACT

A cassette for a sound slide projector has in a casing a first compartment and a second compartment. The first compartment accommodates a tape holding mechanism and is accessible through recesses for forward winding and rewinding of the tape and for recording a message on the tape or playing back such message from the tape. The second compartment accommodates the slide and has in its bottom wall a slot for removing the slide from the cassette into a projection position and for returning the slide into the compartment upon completion of the projection and playback of the tape in the first compartment.

9 Claims, 8 Drawing Figures

INVENTOR.
WILLIAM CASTEDELLO
BY Hawe and Baxley
ATTORNEYS

CASSETTE FOR A SOUND SLIDE PROJECTOR

The present invention relates to a cassette accommodating a magnetic tape and a slide for play-back from the tape or recording thereon and for projection of the slide by means of a sound slide projector and more particularly to a sound slide cassette for use in a projector as disclosed in copending application Ser. No. 757,023 filed Sept. 3, 1968, and matured in U.S. Pat. No. 3,561,856, issued Feb. 9, 1971 the term "magnetic tape" being intended to encompass also sound carriers such as magnetizable wires.

BACKGROUND

A projector according to the afore-referred-to application is designed for use with cassettes which accommodate a slide and a magnetic tape having recorded thereon a message or for recording a message. The projector has means for conveying a plurality of such cassettes one by one to a presentation position in which the optical assembly of the projector is activated to project the respective slide and the sound assembly to play back or to record a message. Projection of a slide entails that the same be moved from the cassette to a projection position and returned into the cassette at the end of the presentation. The projector also requires that the sound heads and erase heads of the projector can coact with the tape in the cassette. A forward winding mechanism common for all cassettes placed in the projector effects forward winding of the tape during play-back or recording and a rewind mechanism also common for all the cassettes effects rewind of the tape upon completion of the play-back of the recorded message or recording of a message.

THE INVENTION

It is a broad object of the invention to provide a novel and improved sound slide cassette which satisfies all the hereinbefore listed requirements of a projector as disclosed in the aforesaid pending application and of projectors of related design.

A more specific object of the invention is to provide a novel and improved sound slide cassette in which the slide is retained by releasable retaining means which are automatically released when the cassette is placed in the cassette tray of the projector so that the slide is free to move out of the cassette and to be returned into the cassette upon completion of the projection, said retaining means upon removal of the cassette from the tray being automatically activated to retain the slide.

Another more specific object of the invention is to provide a novel and improved sound slide cassette in which the supply spool and the take-up spool for the tape are coupled by a slip-friction drive to compensate for the changing tape radii as the tape is wound from the supply spool upon the take-up spool during play-back or recording.

Still another more specific object of the invention is to provide a novel and improved sound slide cassette in which a slight restraint is automatically applied to the spools during rewind of the tape. Such restraint assures smooth unwinding of the tape while moving from the take-up spool back to the supply spool.

A further more specific object of the invention is to provide a novel and improved sound slide cassette in which guide means guide the tape between the spools and through the recesses of the cassette through which the tape is accessible for driving in either direction and play-back or recording thereby assuring continuous and constant coaction of the tape with the forward or reverse drive means and the sound or erase heads of the projector.

A still further object of the invention is to provide a novel and improved sound slide cassette in which each spool includes clamping means for conveniently and safely clamping the tape ends to the spools and releasing the same therefrom.

SUMMARY OF THE INVENTION

The afore-pointed-out objects, features and advantages of the invention and other objects, features and advantages which will be pointed out hereinafter are obtained by providing in a casing a first compartment for accommodating the tape holding mechanism and a second compartment for accommodating a slide. The tape holding mechanism comprises two spools coupled to each other by a slip coupling. The tape while travelling from one spool to the other is accessible through recesses in the first compartment exposing the tape for coaction with the tape drive and the sound or erase heads of the projector. The second compartment has a slot in its bottom for moving the slide from the cassette into a projection position and returning the slide into the cassette upon completion of the projection.

DETAILED DESCRIPTION OF THE INVENTION

In the accompanying drawing a preferred embodiment of the invention is shown by way of illustration and not by way of limitation.

Figures 1, 2, 3, 4, 5, 6, 7, 8:
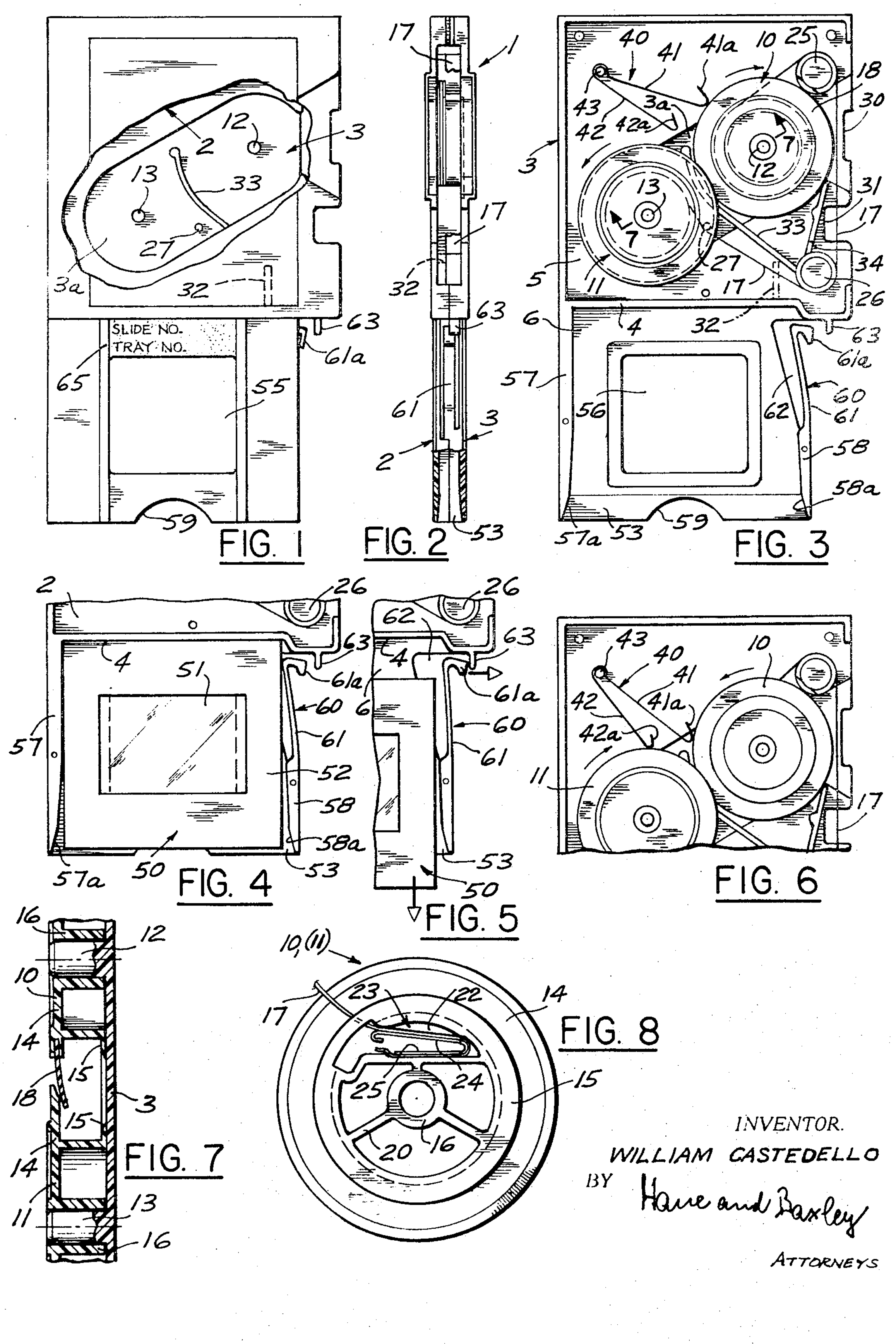
FIG. 1 is a side elevational view of a cassette partly broken open to show some of the internal features of the cassette, the tape and the spools therefor being omitted.
FIG. 2 is an elevational edge view of the cassette with the tape mechanism assembled therein.
FIG. 3 is a side elevational view of the cassette with the spools for the tape and other components of the tape mechanism installed therein, one-half of the cassette casing being removed for clarity of illustration.
FIG. 4 is a fragmentary view of FIG. 3 showing a slide inserted into the cassette and retained therein.
FIG. 5 is a view similar to FIG. 4 but showing the slide released from the cassette and moving out of the cassette.
FIG. 6 is a diagrammatic fragmentary view of FIG. 3 showing part of the tape mechanism during rewind.
FIG. 7 is a section taken on line 7—7 of FIG. 3.
FIG. 8 is a rear view of one of the spools showing the clamping means for the tape.

Referring now to the figures in detail the exemplified sound slide cassette comprises a casing 1 formed by two complementary parts 2 and 3. Part 3 is the part which mounts the tape mechanism and the slide retaining means as will be more fully explained hereinafter and part 2 constitutes the cover for part 3. The casing parts may be made of metal but they are preferably molded of a suitable plastic such as polyethylene. The two parts are joined to each other after assembly of all the components therein by suitable fastening means, such as screws, gluing or heat sealing. Separation of the two parts after completion of the assembly is generally not necessary. The casing has a generally rectangular outline. It is divided by a partition wall 4 into a first compartment 5 and a second compartment 6.

Compartment 5 accommodates the tape mechanism. The tape mechanism comprises a supply spool 10 and a take-up spool 11. The two spools are rotary on pins 12 and 13 molded to casing part 3 or fixedly secured thereto. Each spool has two peripheral flanges 14 and 15; flange 14 faces upwardly and has the larger diameter. Hubs 16 of the two spools serve to accommodate a magnetic tape 17. As best shown in FIG. 1 a shallow well 3*a* is preferably provided in the rear wall of casing 3 to accommodate the flanges 15 of the two spools thereby reducing the overall thickness of the cassette. A similar well may also be provided in casing part 2. One of the two spools, preferably supply spool 10, has a peripheral flange 18 radially extending from flange 14 and made of a suitable flexible rubber or a plastic such as neoprene. The upper surface of flange 18 is a high friction surface and engages the flange 14 of spool 11, either overlapping or underlying the flange thereby coupling the two spools by a slip-friction coupling.

Tape 17 is secured at each end to one of the spools. Referring to FIG. 8 flange 15 of each spool is joined by ribs 20 to central hub 16. Such structure of the lower flange of the spools reduces the weight thereof and also provides a space 22 for receiving therein a clamping means 23 for securing the respective end of the tape to the spool. The clamping means is shown as a generally V-shaped spring having arms 24 and 25 about which the end of the tape is wrapped as is clearly shown in the figure. The spring is then inserted into space 23 under tension thereby safely retaining the tape end and also permitting a convenient detachment of the tape, if necessary, by simply pulling the spring out of its space.

The tape is guided from one spool to the other by guide means best shown in FIG. 3. The guide means comprise two circular guides 25 and 26 preferably molded to the rear wall of casing part 3. The tape is guided by these guides along a straight path while moving through recesses 30 and 31 and is further guided by a guide pin 27 next to the take-up spool 11. Recesses 30 and 31 make the tape accessible while travelling along the straight path between guides 25 and 26. More specifically, recess 30 permits coaction of the tape with the forward drive capstan or the rewind capstan of the projector according to the aforesaid patent application and recess 31 permits coaction with the sound head or erase head of the projector. A guide rib 32 prevents or at least impedes lateral fluttering of the tape particularly when the tape is traversing recess 31 to assure that the tape is in continuous and constant contact with one of the capstans or heads of the projector. Finally, a curved rib 33 prevents the tape from becoming entangled when passing from one spool to the other. Ribs 32 and 33 are preferably molded to the rear wall of casing part 3 and serve as reinforcements for casing part 3; for the same purpose one or more additional ribs may be provided.

The arrows in FIG. 3 indicate the rotational directions of the spools during forward drive of the tape and the arrows in FIG. 6 the rotational directions of the spool during rewind.

The tape mechanism further comprises a tape braking means 40 to apply a gentle braking force to both spools during rewind to assure smooth passage from the take-up spool 11 to the supply spool 10. The braking means is shown by way of example as a generally V-shaped toggle spring having a long arm 41 and a short arm 42 both preferably ending in a smoothly curved hook 41*a* and 42*a*, respectively to avoid damage to the tape. The spring is pivotal at its apex on a pin 43 preferably molded to the rear wall of casing part 3.

During forward drive (see FIG. 3) engagement of arm 41 with outer flange 18 of spool 10 retains the spring in the position of FIG. 3 in which the hook of arm 41 is in slidable engagement with the rim of flange 18 without exerting appreciable pressure thereupon and the hook of arm 42 is clear of the flange of spool 11. Rewind of the tape (see FIG. 6) forces the toggle spring past its dead center thereby causing arm 41 to engage spool 10 with pressure and arm 42 engages spool 11 also with slight pressure as is clearly indicated in FIG. 6 thereby applying a braking action to both spools.

The rotational control exerted upon both spools by the toggle spring and by the aforedescribed slip coupling between the two spools effectively prevents unspooling or entangling of the tape while the same is being rewound. Such control is particularly important when the projector in which the cassette is used is equipped with fast rewind.

Compartment 6 accommodates as previously described, a slide 50. This slide should be visualized as a conventional slide such as a 35 mm photographic transparency fitted in a frame 52 made of cardboard or plastic. The outline of the compartment is such that it will just fit the slide. The compartment has a slot 53 at its bottom end to remove the slide from the cassette to a projection position in the projector and to return the slide into the cassette by a return mechanism of the projector at the end of the allotted projection time. The photographic transparency can be projected through appropriately dimensioned windows 55 and 56 in the two parts of the cassette. Ribs 57 and 58 steady the slide at the respective sides thereof and the depth of insertion of the slide into the compartment is limited by partition wall 4. A cut-out 59 facilitates removal of the slide and tapers 57*a* and 58*a* guide the slide during initial insertion thereof into the cassette and during return upon completion of a projection.

The slide is releasably retained in compartment 6 by a slide retaining means 60. This retaining means is shown by way of example in the form of a flexible tongue 61, preferably molded at one end to casing part 3, and biased into a cut-out 62 provided in the right hand side wall of casing part 3 so that the tongue will engage the respective side edge of the slide with pressure when the slide is pushed into its compartment as is shown for instance, in FIG. 4 thereby retaining the slide in position. The tongue may terminate at its free end in a hook 61*a* which is engageable with a release means provided in the projector and retaining the hook clear of the slide when the cassette is inserted into the tray of the projector thereby freeing the slide for movement into the projection position. A nose 63 is preferably provided to protect the tongue against excessive bending which may break the tongue.

As is shown in FIG. 1 at 65 the outside of casing part 2 may have a matted or roughened strip to facilitate the writing of notes identifying the cassette.

Cassettes as hereinbefore described function as follows:

The cassettes are inserted into the tray of a sound slide projector of the kind disclosed in the aforelisted pending application in upright position, that is, in a position in which compartment 5 housing the spools etc. is at the top and are retained in this position. The slide in each cassette is automatically freed by retracting tongue 61 from the slide by the release means constituting part of the projector as previously described. The bottom of the tray is closed except for a discharge slot so that the slides remain in the cassette by resting on the bottom of the tray even though they are freed. The transport mechanism of the projector moves the cassettes successively and one-by-one toward the presentation position in which the respective slide is in registry with the tray slot. Accordingly, the slide will drop due to gravity into the projection position. Simultaneously, the optical assembly and the sound assembly of the projector are activated to project the slide and to play back the message recorded on the tape while the tape is being wound from supply spool 10 upon take-up spool 11. Upon completion of the message the rewind mechanism returns the tape to the supply spool and the slide is lifted back into the cassette by a lifting mechanism. The transport mechanism of the projector thereupon moves the next cassette into the presentation position.

The aforedescribed sequence of operations does not constitute part of the present invention and is fully described in the afore listed patent application.

While the cassettes according to the invention are described in connection with projectors having a circular rotating tray as is shown in the pending patent application, they are equally suitable for use in projectors with a rectangular tray in which the cassettes are moved into and out of the presentation position along a rectilinear path. The cassettes may further be used with projectors which do not require removal of the slide from the cassette during projection. As is evident, windows 55 and 56 in the casing of the cassette permit projection of the slide while within the cassette.

Recording of a message on the tape is effected in a conventional manner while the tape is driven from the supply spool to the take-up spool by activating the recording assembly of the projector.

The cassette as described herein is a self-contained and complete unit which does not require any operations on the part of the user except slipping a slide into the cassette and recording an appropriate message on the tape in the cassette in a conventional manner.

What is claimed is:

1. A cassette for a sound slide projector, said cassette comprising:

a casing having a top wall, a bottom wall and two side walls and including an upper first compartment for accommodating therein a magnetic tape holding assembly and a lower second compartment for accommodating therein a slide, a side wall portion of the casing juxtaposed to the first compartment including a first recess for making the tape accessible for coaction with a forward drive capstan or a rewind capstan and a second recess spaced apart from the first recess for making the tape accessible for coaction with a sound head or an erase head, the bottom wall of the casing including an elongate slot for gravity drop of a slide out of the second compartment and insertion of a slide into the second compartment; and externally releasable slide retaining means biased into engagement with a slide in the second compartment for releasably retaining the slide in said compartment, release of said retaining means freeing the slide for gravity drop out of the second compartment through said slot, said retaining means including a recess in a side wall portion of the casing juxtaposed to the second compartment and a spring secured at one end to the casing and biased to protrude into the second compartment through said side wall recess for releasable engagement with a slide in said second compartment, said spring including an outwardly protruding extension for withdrawing the spring from said engagement.

2. The cassette according to claim 1 wherein said compartments are disposed in alignment and the tape holding assembly in the upper compartment comprises a supply spool and a take-up spool rotatably mounted in said compartment in substantially coplanar relationship, one end of the tape being secured to the supply spool and the other end to the take-up spool, and guide means supported by and within said compartment for guiding the tape from one spool to the other along a path within said upper compartment traversing said first and second recess.

3. The cassette according to claim 2 wherein said spools are directly and peripherally coupled by slip-friction coupling means.

4. The cassette according to claim 3 wherein said slip-friction coupling means comprise a ring of flexible high friction material secured to the periphery of one of said spools radially protruding therefrom and overlapping the peripheral rim of the other spool in frictional engagement therewith thereby transmitting a limited rotational force from said one spool to said other spool.

5. The cassette according to claim 2 and comprising a unidirectional brake means coacting with said spools to apply to the same a limited braking force during rewind of the tape.

6. The cassette according to claim 5 wherein said unidirectional brake means comprise a toggle spring pivotally supported by the casing within said first compartment, said toggle spring including a first springy arm in continuous sliding engagement with the periphery of the supply spool and a second springy arm slidably engageable with the periphery of the take-up spool, rotation of the supply spool in rewind direction forcing said toggle spring past its dead center, said movement of the toggle spring causing the first arm to engage the supply spool with pressure engagement and the second arm to engage the take-up spool thereby applying the braking force to both spools.

7. The cassette according to claim 6 wherein said toggle spring is a generally V-shaped spring having a first long arm and a second short arm, the long arm coacting with the supply spool and the short arm with the take-up spool, said spring being supported by the casing pivotal about its apex.

8. The cassette according to claim 2 and comprising a fastener for releasably fastening the ends of the tape to the spools, each of said fasteners including a clamping spring for wrapping thereabout the respective tape end, each of said spools including a recess for receiving and retaining therein one of the clamping springs for holding the respective tape end between the spring and the respective spool by spring pressure.

9. The cassette according to claim 8 wherein each of said clamping springs is a V-shaped spring, each tape end being folded about the outside of the respective spring and the arms of the springs with the tape ends thereon being inserted into the recesses with a pressure fit.

* * * * *